United States Patent [19]
Kim

[11] Patent Number: 5,946,421
[45] Date of Patent: Aug. 31, 1999

[54] METHOD AND APPARATUS FOR COMPENSATING QUANTIZATION ERRORS OF A DECODED VIDEO IMAGE BY USING AN ADAPTIVE FILTER

[75] Inventor: Jong-Il Kim, Seoul, Rep. of Korea

[73] Assignee: Daewoo Electronics Co. Ltd., Seoul, Rep. of Korea

[21] Appl. No.: 08/924,080

[22] Filed: Aug. 28, 1997

[30] Foreign Application Priority Data

Aug. 30, 1996 [KR] Rep. of Korea .................. 96-36972

[51] Int. Cl.[6] ........................................ G06T 5/00
[52] U.S. Cl. .................. 382/261; 382/233; 382/264; 348/403
[58] Field of Search ............................ 382/233, 261, 382/264; 348/403, 404

[56] References Cited

U.S. PATENT DOCUMENTS

| | | | |
|---|---|---|---|
| 5,475,434 | 12/1995 | Kim | 348/403 |
| 5,598,213 | 1/1997 | Chung et al. | 348/405 |
| 5,610,729 | 3/1997 | Nakajima | 358/463 |
| 5,737,451 | 4/1998 | Gandhi et al. | 382/268 |

FOREIGN PATENT DOCUMENTS 0526885  2/1993  European Pat. Off. .
0796011  9/1997  European Pat. Off. .

*Primary Examiner*—Edward L. Coles
*Assistant Examiner*—Jimmy Nguyen
*Attorney, Agent, or Firm*—Anderson, Kill & Olick, P.C.

[57] ABSTRACT

An encoded video signal is decoded to obtain a decoded video signal, wherein the decoded video signal includes a previous and a current frames and is processed an a macroblock-by-macroblock basis, each frame's data containing pixel values, by deriving a set of quantized discrete cosine transform coefficients corresponding to current frame data and converting the set of quantized discrete cosine transform coefficients into a set of discrete cosine transform coefficients. Thereafter, depending on the complexity of the current frame data detected, high frequency components of the set of discrete cosine transform coefficients within a preset region are filtered based on the set of discrete cosine transform coefficients and the complexity of the current frame data, to thereby produce a set of filtered discrete cosine transform coefficients. The set of filtered discrete cosine transform coefficients is transformed into a set of inverse discrete cosine transform data, and the current frame data is generated through the use of motion compensation and provided as the decoded video signal.

9 Claims, 3 Drawing Sheets

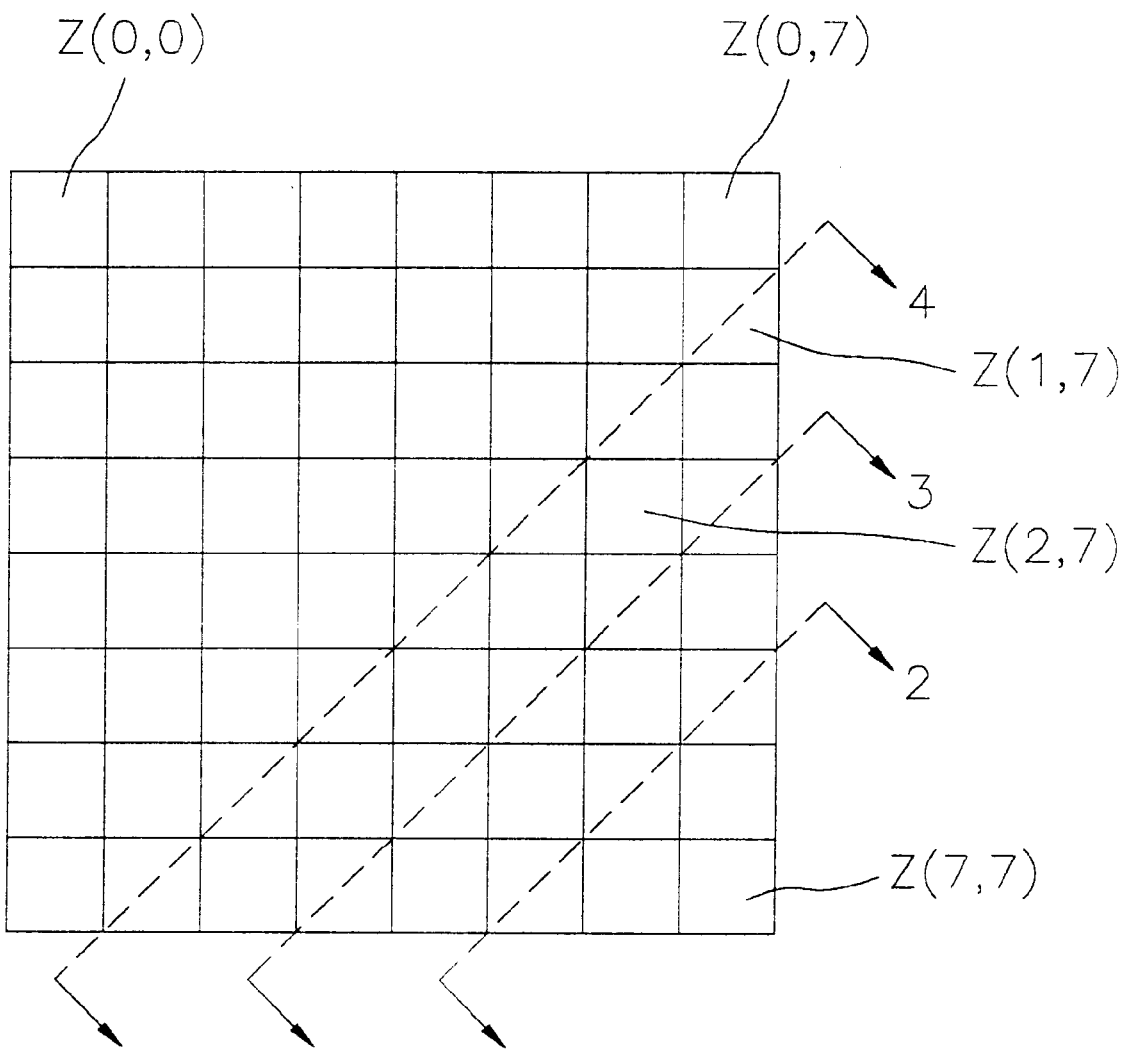

METHOD AND APPARATUS FOR COMPENSATING QUANTIZATION ERRORS OF A DECODED VIDEO IMAGE BY USING AN ADAPTIVE FILTER

FIELD OF THE INVENTION

The present invention relates to a method and apparatus for compensating quantization errors of a decoded video image by using an adaptive filter; and, more particularly, to a method and apparatus capable of adaptively filtering high frequency components depending on the complexity of current frame data.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of various data compression techniques, especially, in the case of such low bit-rate video signal encoders as video-telephone and teleconference systems.

The video signal can be normally compressed without seriously affecting its integrity because there usually exist certain correlationships or redundancies among some of the pixels in a single frame and also among those of neighboring frames. Among various video compression techniques, the so-called hybrid coding technique, which combines temporal and spatial compression techniques together with a statistical coding technique, is known to be most effective.

Most hybrid coding techniques employ an adaptive inter/intra mode coding, orthogonal transform, quantization of transform coefficients, and VLC(variable length coding). The adaptive inter/intra mode coding is a process of selecting a video signal for a subsequent orthogonal transform from either PCM(pulse code modulation) data of a current frame of DPCM(differential pulse code modulation) data adaptively, e.g., based on a variance thereof. The inter mode coding, also known as the predictive method, which is based on the concept of reducing the redundancies between neighboring frames, is a process of determining the movement of an object between a current frame and its one or two neighboring frames, predicting the current frame according to the motion flow of the object, and producing a difference signal representing the difference between the current frame and its prediction. This coding method is described, for example, in Staffan Ericsson, "Fixed and Adaptive Predictors for Hybrid Predictive/Transform Coding", IEEE Transactions on Communications, COM-33, No. 12(December 1985); and in Ninomiya and Ohtsuka, "A Motion Compensated Interframe Coding Scheme for Television Pictures", IEEE Transactions on Communications, COM-30, No. 1(January 1982), both of which are incorporated herein by reference.

The orthogonal transform, which exploits the spatial correlationships between image data such as PCM data of the current frame and motion compensated DPCM data and reduces or removes spatial redundancies therebetween, is used to convert a block of digital image data into a set of transform coefficients. This technique is described in Chen and Pratt, "Scene Adaptive Coder", IEEE Transactions on Communications, COM-32, No. 3(March 1984). By processing such transformation coefficient data with quantization and VLC, the amount of data to be transmitted can be effectively compressed.

Specifically, in the orthogonal transform such as DCT (discrete cosine transform) or the like, the image data is divided into equal-sized blocks, for example, blocks of 8×8 pixels, and each of the blocks is transformed from the spatial domain to the frequency domain. The DC coefficient of the block reflects the average intensity of the pixels in the block. In general, the pixels in the intra mode input video signal have values ranging from 0 to 255, giving a dynamic range for the intra block DC transform coefficient from 0 to 2040 which can be represented in 11 bits; and a maximum dynamic range for any intra block AC transform coefficient from about −1000 to 1000. In case of an inter mode input video signal whose pixels have values ranging from −255 to 255, a maximum dynamic range for any AC or DC transform coefficient is about −2000 to 2000.

The orthogonal transform coefficients resulting from the orthogonal transform are then quantized. In carrying out the quantization, a smaller quantization step size obviously entails a larger amount of data requiring a larger number of code bits for the representation thereof, whereas a larger quantization step size results in a lower volume of data needing a fewer number of code bits for their representation. And, a larger number of code bits can represent an image more precisely than a fewer number of code bits. Accordingly, there exists a tradeoff between the amount of data or burden thrust upon a transmission channel and the quality of the image transmitted.

There are various quantization step size control schemes. In these schemes, the quantization step size control usually means the control of the step size employed in quantizing inter block AC and DC, and intra block AC coefficients. Such quantization step size control is determined based on the amount of data currently stored in a buffer memory and the complexity of the input video signal. In case of the inter block AC and DC, and intra block DC coefficient, it is quantized with a relatively small fixed step size, e.g., 16 or 8, as described in the MPEG-2 standard; and in case of the intra block AC coefficients, the quantization step size of higher frequency is larger than that of a lower frequency.

Blocking effect is a phenomenon wherein the border line of a block becomes visible at a receiving end. Such blocking effect occurs since a frame is encoded in units of blocks; and may become more serious as the quantization step size becomes larger, i.e., as the blocks undergo a more coarse quantization. Accordingly, in the intra block AC coefficients, since the quantization step size of a higher frequency is larger than that of a lower frequency, the intensity difference between a block and its adjacent blocks may become even more pronounced, thereby resulting in a more severe blocking effect and degrading the quality of the image. Even in the case of inter mode coding with motion compensated frame prediction, while blocking effects being not be so disturbing, they may still be noticeable.

SUMMARY OF THE INVENTION

It is, therefore, a primary object of the invention to provide an improved method for compensating quantization errors by using an adaptive filter.

In accordance with the present invention, there is provided a method for producing a decoded video signal by decoding an encoded video signal, wherein the decoded video signal includes a previous and a current frames and is processed on a macroblock-by-macroblock basis, frame data of each of the frames containing pixel values, comprising the steps of: (a) processing the encoded video signal by using a variable length decoding technique to thereby derive a set of quantized discrete cosine transform coefficients corresponding to current frame data; (b) converting the set of quantized discrete cosine transform coefficients into a set of discrete cosine transform coefficients based on quantization parameters of the current frame; (c) detecting complexity of the current frame data based on previous frame data decoded prior to the current frame data; (d) filtering high frequency components of the set of discrete cosine transform coefficients within a preset region based on the set of discrete cosine transform coefficients and the complexity of the current frame data, to thereby produce a set of filtered discrete cosine transform coefficients; (e) transforming the set of filtered discrete cosine transform coefficients into a set of inverse discrete cosine transform data; (f) generating the current frame data through the use of motion compensation based on the set of the inverse discrete cosine transform data and the previous frame data; and (g) providing the current frame data as the decoded video signal.

BRIEF DESCRIPTION OF THE DRAWINGS

The above and other objects and features of the present invention will become apparent from the following description of a preferred embodiment given in conjunction with the accompanying drawings, in which:

FIG. 3 depicts frequency components of a set of discrete cosine transform coefficients which are set to "0" based on the complexity of a current frame data.

DETAILED DESCRIPTION OF THE PREFERRED EMBODIMENTS

Figure 1:
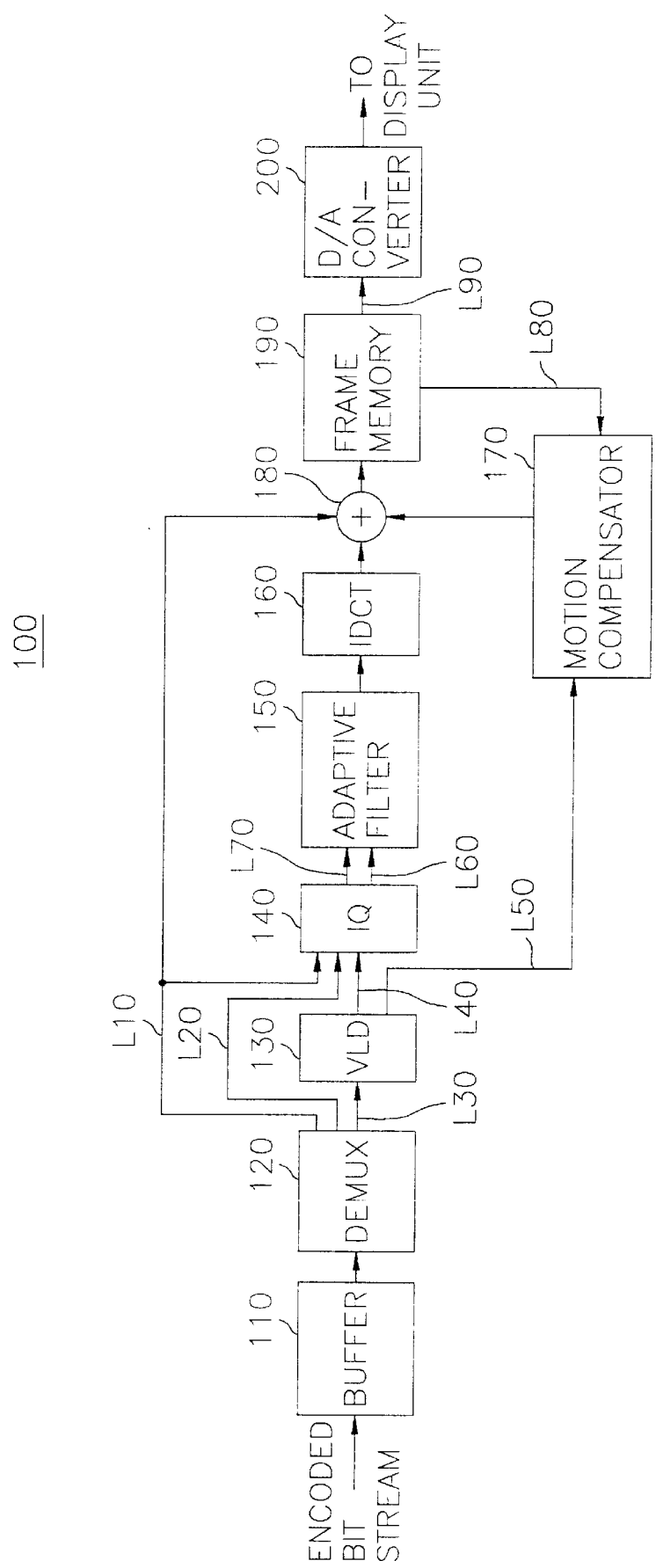
FIG. 1 illustrates a block diagram of a decoder having an adaptive filter in accordance with the present invention.

Referring to FIG. 1, there is illustrated a block diagram of a decoder 100 having an adaptive filter 150 in accordance with a preferred embodiment of the present invention.

As shown in FIG. 1, an encoded bit stream is provided from a corresponding conventional encoder(not shown) to the decoder 100, in particular, to a buffer 110. The buffer 110 receives the encoded bit stream and supplies it at a fixed rate to a demultiplexer(DEMUX) 120 on a macroblock-by-macroblock basis wherein the encoded bit stream is demultiplexed to produce a decoding information signal such as an inter/intra mode signal and a quantization step, and encoded image data, i.e., a set of variable length coded transform coefficients and motion vectors. The inter/intra mode signal is applied to an inverse quantizer(IQ) 140 and an adder 180 via a line L10, and the quantization step is applied to the inverse quantizer 140 via a line L20, and the set of variable length coded transform coefficients and the motion vectors are supplied to a variable length decoder(VLD) 130 via a line L30.

The variable length decoder 130 decodes the set of variable length coded transform coefficients and the motion vectors and provides a set of quantized discrete cosine transform coefficients to an inverse quantizer 140 via a line L40 and motion vectors to a motion compensator 170 via a line L50. The set of quantized discrete cosine transform coefficients for each macroblock included in the encoded bit stream include one DC coefficient and, e.g., 63 AC coefficients.

At the inverse quantizer 140, the set of the quantized discrete cosine transform coefficients is converted into a set of discrete cosine transform coefficients, and a quantization parameter is calculated in response to the inter/intra mode signal on the line L10 and the quantization step on the line L20 from the demultiplexer 120. The quantization parameter and the set of discrete cosine transform coefficients are provided to the adaptive filter 150 via a line L60 and a line L70 respectively.

The adaptive filter 150 is provided with the quantization parameter via the line L60 and the set of discrete cosine transform coefficients via the line L70 from the inverse quantizer 140; calculates the complexity of a current frame by using the quantization parameters of the previous frame each of which corresponds to each macroblock within the previous frame; and selectively sets high frequency components to "0" to thereby provide a set of adaptively filtered discrete cosine transform coefficients to an inverse discrete cosine transformer(IDCT) 160. The operation of the adaptive filter 150 is further described in detail with reference to FIGS. 2 and 3.

At the inverse discrete cosine transformer 160, the set of adaptively filtered discrete cosine transform coefficients is converted into a set of adaptively filtered inverse discrete cosine transform data which is provided to the adder 180.

In the meanwhile, the motion compensator 170 extracts corresponding pixel data from previous frame data stored in a frame memory 190 via a line L80 based on the motion vectors from the variable length decoder 130 via the line L50 and provides the extracted pixel data as a set of motion compensated image data to the adder 180.

At the adder 180, the set of adaptively filtered inverse discrete cosine transform data from the inverse discrete cosine transformer 160 is added, or not added, to the set of motion compensated image data from the motion compensator 170 in response to the inter/intra mode signal on the line L10, to thereby generate an adaptively filtered image data. In case of the inter mode, the set of inverse discrete cosine transform data is added to the set of motion compensated image data; and in case of the intra mode, the set of inverse discrete cosine transform data is provided through the adder 180 to the frame memory 190 without any adding operation. The adaptively filtered image data is stored in the frame memory 190 as previous frame data, and is provided to a digital to analog converter 200 via a line L90.

The digital to analog converter 200 converts the adaptively filtered image data to an analog signal to thereby provide same to a display unit(not shown) as a decoded video signal.

The detailed operation of the adaptive filter 150 will be described hereinafter.

Figure 2:
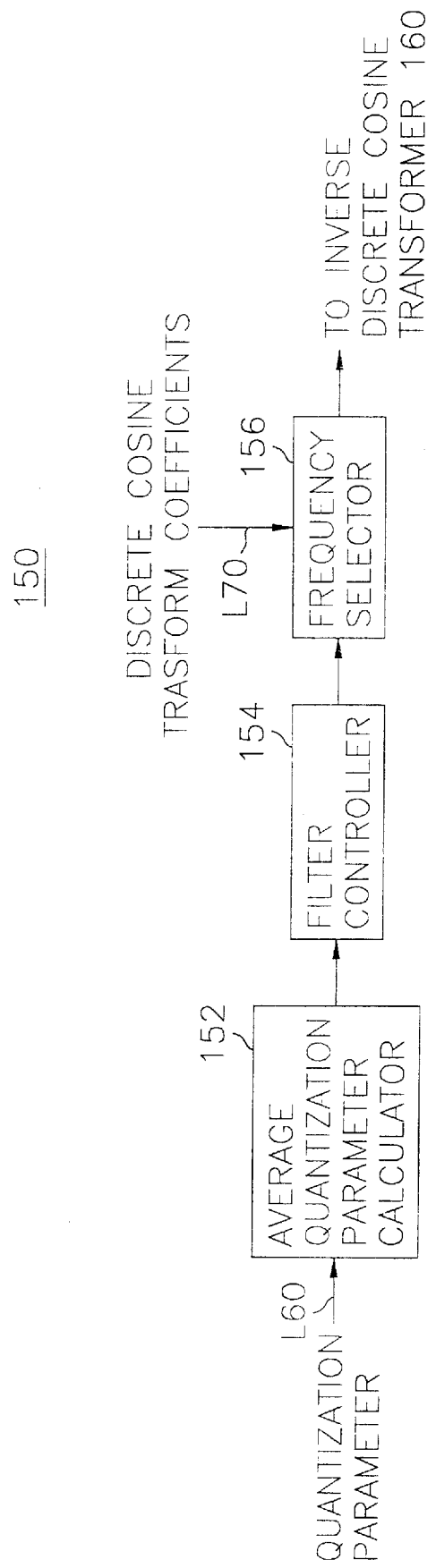
FIG. 2 represents a detailed diagram of the adaptive filter shown in FIG. 1.

Referring to FIG. 2, there is illustrated detailed block diagram of the adaptive filter 150 shown in FIG. 1. An average quantization parameter calculator 152 is provided with the quantization parameters of all the macroblocks within the current frame from the inverse quantizer 140 via the line L60 and calculates an average quantization parameter of the current frame by averaging quantization parameters of each macroblock within the current frame. The average quantization parameter of the current frame is stored in the average quantization parameter calculator 152 to thereby be used for the filter controlling of the next frame, and an average quantization parameter of the previous frame is extracted to be supplied to a filter controller 154 to thereby be used for the filter controlling of the current frame, wherein the average quantization parameter of the previous frame is calculated and stored, in a similar manner as the average quantization parameter of the current frame, based on quantization parameters of each macroblock within the previous frame.

Specifically, if the size of the current frame is M×N pixels and the size of each macroblock within the current frame is L×L pixels, the number of the macroblocks within the current frame is (M/L)×(N/L), L, M and N being a positive integer, respectively. Since each macroblock has one quantization parameter, the number of the quantization parameters after decoding the current frame becomes (M/L)×(N/L). For instance, if the size of the current frame is 352×288 and the size of each macroblock within the current frame is 16×16, then the number of the macroblock within the current frame is (352/16)×(288/16)=22×18=396 and the number of the quantization parameters is also 396. In accordance with the present invention, the quantization parameters of all the macroblocks within the current frame are averaged to thereby be used in determining the complexity of the next frame data.

A calculated average quantization parameter is associated with the amount of information of a video image; if the video image being decoded is complex, the average quantization parameter becomes large; and if otherwise, the average quantization parameter becomes small.

The average quantization parameter calculator 152 provides the calculated average quantization parameter of the previous frame to the filter controller 154. The filter controller 154 generates a filter control signal which is used to determine frequency components of the discrete cosine transform coefficients to be set to "0".

The filter control signal is calculated by using Eq. (1) as follows:

$$C = 1 \quad \text{if } AQP \le 16 \quad \text{Eq. (1)}$$
$$= 1 + \text{ROUND}\{(AQP - 16)/5\} \quad \text{if } AQP > 16$$

In Eq. (1), C is the filter control signal, AQP is the average quantization parameter, and ROUND is an operation which rounds off its operand to the nearest whole number. Since the quantization parameter of a conventional encoder ranges from 1 to 31, the filter control signal, in logic level, ranges from 1 to 4. For example, if the average quantization parameter is 28, C becomes 3 as follows:

$$C = 1 + \text{ROUND}\{(28 - 16)/5\}$$
$$= 1 + \text{ROUND}(12/5)$$
$$= 1 + \text{ROUND}(2.4)$$
$$= 3.$$

A frequency selector 156 is provided with the calculated filter control signal from the filter controller 154 and the set of discrete cosine transform coefficients from the inverse quantizer 140 via the line L70. If the filter control signal is 1, the frequency selector 156 bypasses the set of discrete cosine transform coefficients without filtering; and if the filter control signal is larger than 1, the frequency selector 156 sets the high frequency components of the set of discrete cosine transform coefficients to "0".

That is, the frequency selector 156 selects the frequency components to be set to "0" in response to the filter control signal from the filter controller 154. Referring to FIG. 3, there is illustrated an exemplary diagram showing the region of frequency components to be set to "0" in response to the filter control signal when N is 8. As shown in FIG. 3, the discrete cosine transform coefficients below a dotted line are set to "0" in response to the filter control signal.

Eventually, the frequency selector 156 provides a set of adaptively filtered discrete cosine transform coefficients to the inverse cosine transformer 160, wherein the high frequency components thereof are set to "0" based on the complexity of the current frame data. The complexity of the current frame data is calculated from the quantization parameters of each macroblock within the previous frame.

In accordance with the present invention, the complexity of the current frame data is determined by averaging the quantization parameters of each macroblocks within the previous frame; if the current frame data is complex according to the average quantization parameter, high frequency components of the video image which is insensitive to human visual characteristic is filtered; and depreciation of the image quality due to quantization errors is efficiently reduced.

While the present invention has been described with respect to certain preferred embodiments only, other modifications and variations may be made without departing from the spirit and scope of the present invention as set forth in the following claims.

What is claimed is:

1. A method for producing a decoded video signal by decoding an encoded video signal, wherein the decoded video signal includes a previous and a current frames and is processed on a macroblock-by-macroblock basis, comprising the steps of:

(a) processing the encoded video signal by using a variable length decoding technique to thereby derive a set of quantized discrete cosine transform coefficients corresponding to current frame data;

(b) converting the set of quantized discrete cosine transform coefficients into a set of discrete cosine transform coefficients based on quantization Parameters of the current frame, wherein the quantization parameters of the current frame correspond to macroblocks within the current frame;

(c) detecting complexity of the current frame data based on quantization parameters of the previous frame decoded prior to the current frame data;

(d) filtering high frequency components of the set of discrete cosine transform coefficients within a preset region based on the set of discrete cosine transform coefficients and the complexity of the current frame data, to thereby produce a set of filtered discrete cosine transform coefficients, wherein the step (d) includes the steps of:

(d1) producing a filtering control signal depending on the complexity of the current frame data, wherein the filtering control signal is determined as:

$$C = 1 \quad \text{if } AQP \le 16$$
$$1 + \text{ROUND}\{(AQP - 16)/5\} \quad \text{if } AQP > 16$$

C being the filtering control signal; AO, the average quantization parameter of the previous frame; and ROUND, an operation which rounds off its operand to a nearest whole number; and (d2) filtering, in response to the filtering control signal, the high frequency components of the set of discrete cosine transform coefficients within the preset region in order to generate the set of filtered discrete cosine transform coefficients;

(e) transforming the set of filtered discrete cosine transform coefficients into a set of inverse discrete cosine transform data;

(f) generating the current frame data through the use of motion compensation based on the set of the inverse discrete cosine transform data and the previous frame data; and (g) providing the current frame data as the decoded video signal.

2. The method as recited in claim 1, wherein the high frequency components of the set of discrete cosine transform coefficients within the preset region are set to a digit value "0".

3. The method as recited in claim 2, wherein the filtering control signal has more than two logic levels in order to adaptively filter the high frequency components of the set of discrete cosine transform coefficients.

4. The method as recited in claim 3, wherein the preset region is changed in response to the filtering control signal, the width of the preset region becoming larger as the value of the filtering control signal increases.

5. An apparatus for producing a decoded video signal by decoding an encoded video signal, wherein the decoded video signal includes a previous and a current frames and is processed on a macroblock-by-macroblock basis, frame data of each of the frames containing pixel values, which comprises:

means for storing previous frame data decoded prior to current frame data;

means for processing the encoded video signal by using a variable length decoding technique to thereby derive a set of quantized discrete cosine transform coefficients;

means for converting the set of quantized discrete cosine transform coefficients into a set of discrete cosine transform coefficients based on quantization parameters of the current frame, wherein the quantization parameters of the current frame corresponds to macroblocks within the current frame;

means for filtering high frequency components of the set of discrete cosine transform coefficients within a preset region based on the set of discrete cosine transform coefficients and the previous frame data, to thereby produce a set of filtered discrete cosine transform coefficients, wherein the filtering means includes:

means for detecting complexity of the current frame data based on quantization parameters of the previous frame which correspond to macroblocks within the previous frame;

means for producing a filtering control signal in response to the complexity of the current frame data, wherein the filtering control signal is determined as:

$$C = 1 \quad \text{if } AQP \leq 16$$

$$1 + \text{ROUND}\{(AQP - 16)/5\} \quad \text{if } AQP > 16$$

C being the filtering control signal; AQP, the average quantization parameter of the previous frame; and ROUND, an operation which rounds off its operand to a nearest whole number; and means for filtering, in response to the filtering control signal, the high frequency components of the set of discrete cosine transform coefficients within the preset region in order to generate the set of filtered discrete cosine transform coefficients;

means for transforming the set of filtered discrete cosine transform coefficients into a set of inverse discrete cosine transform data;

means for generating the current frame data through the use of motion compensation based on the set of the inverse discrete cosine transform data and the previous frame data; and means for providing the current frame data as a new previous frame data to the storing means and supplying the current frame data as the decoded video signal.

6. The apparatus according to claim 5, wherein the detecting means includes:

a memory means for storing the quantization parameters of the previous frame which correspond to the macroblocks within the previous frame processed prior to the current frame;

means for averaging the quantization parameters of the previous frame stored in the memory means; and means for providing the average quantization parameter of the previous frame as the complexity of the current frame data.

7. The apparatus according to claim 6, wherein the high frequency components of the set of discrete cosine transform coefficients within the preset region are set to a digit value "0".

8. The apparatus according to claim 7, wherein the filtering control signal has more than two logic levels in order to adaptively filter the high frequency components of the set of discrete cosine transform coefficients.

9. The apparatus according to claim 8, wherein the preset region is changed in response to the filtering control signal, the width of the preset region becoming larger as the value of the filtering control signal increases.

* * * * *